United States Patent
Slotznick

(10) Patent No.: US 6,907,571 B2
(45) Date of Patent: Jun. 14, 2005

(54) ADJUNCT USE OF INSTANT MESSENGER SOFTWARE TO ENABLE COMMUNICATIONS TO OR BETWEEN CHATTERBOTS OR OTHER SOFTWARE AGENTS

(76) Inventor: Benjamin Slotznick, 507 Third St., Mt. Gretna, PA (US) 17064

( * ) Notice: Subject to any disclaimer, the term of this patent is extended or adjusted under 35 U.S.C. 154(b) by 640 days.

(21) Appl. No.: 09/796,568

(22) Filed: Feb. 28, 2001

(65) Prior Publication Data

US 2001/0033298 A1 Oct. 25, 2001

Related U.S. Application Data

(60) Provisional application No. 60/186,139, filed on Mar. 1, 2000.

(51) Int. Cl.[7] .......................... G06F 17/00; G06F 17/20; G06F 15/16
(52) U.S. Cl. .......................... 715/758; 715/751; 706/11; 709/204
(58) Field of Search ................................. 715/706, 751, 715/753, 758, 759, 752, 755, 757; 706/11, 60, 62, 909, 917; 709/204–206, 202, 250; 704/258

(56) References Cited

U.S. PATENT DOCUMENTS 5,796,396 A * 8/1998 Rich .......................... 345/741
6,363,301 B1 * 3/2002 Tackett et al. .............. 700/246
6,396,509 B1 * 5/2002 Cheng ........................ 345/706
6,559,863 B1 * 5/2003 Megiddo .................... 345/753
6,657,643 B1 * 12/2003 Horvitz et al. .............. 345/764
6,728,760 B1 * 4/2004 Fairchild et al. ............ 709/217

OTHER PUBLICATIONS

Mauldin, Michael, L., "Chatterbots, Tinymuds, and the Turing Test: Entering The Loebner Prize Competition", Jan. 24, 1994, Presented at AAAI–94, http://www.lazytd.com/lti/pub/aaai94.html.*

Foner, Leonard N., "Entertaining Agents: A Sociological Case Study", 1997.*

* cited by examiner

Primary Examiner—John Cabeca
Assistant Examiner—Brian Detwiler
(74) Attorney, Agent, or Firm—Akin Gump Strauss Hauer & Feld, LLP

(57) ABSTRACT

A user's chatterbot participates in a chat session with other users and the other users' chatterbots. The originator of an incoming instant message is identified to such a degree that a buddy on a buddy list is able to determine that the instant message was sent by a user's chatterbot (e.g., "Jackie's chatterbot"), and not the user ("Jackie"). The chatterbots can communicate with other chatterbots while the chatterbots' users listen to the chatterbots converse. The chatterbots may respond to messages originated by other chatterbots' messages and buddies' (users') messages.

16 Claims, 4 Drawing Sheets

ADJUNCT USE OF INSTANT MESSENGER SOFTWARE TO ENABLE COMMUNICATIONS TO OR BETWEEN CHATTERBOTS OR OTHER SOFTWARE AGENTS

CROSS-REFERENCE TO RELATED APPLICATIONS

This application claims the benefit of U.S. Provisional Application No. 60/186,139 filed Mar. 1, 2000, entitled "ADJUNCT USE OF INSTANT MESSENGER SOFTWARE TO ENABLE COMMUNICATIONS TO OR BETWEEN CHATTERBOTS OR OTHER SOFTWARE AGENTS."

BACKGROUND OF THE INVENTION

Instant messaging software (such as AOL Instant Messenger or ICQ) allows real time chat ("instant messaging" or "instant chat") over the Internet or other network among a predefined group of people (a "buddy list"). It runs in the background on each user's computer and alerts the user if any member of the buddy list comes on line (and is available for chat) or if any member of the buddy list posts a message. In some ways it is like a telephone party line. With instant chat software, a user types in a message to his buddy (although speech recognition software can "type" the message) which is then transmitted. The computer screen of each member of the buddy list who is running the software displays a box or window with the name of the person transmitting the message and the message he or she has transmitted. A text to speech synthesizer can "speak" the message.

There are software chatterbots that are designed to mimic human conversations with their human users. The chatterbot output may be text or synthesized speech. The chatterbot may (e.g., Haptek Virtual Friends), but need not, also output the image or animation of a head speaking the conversation. The input may be text or require speech recognition software.

There are electromechanical devices with embedded circuitry, such as the toys Baby Furby and Interactive Barney, that mimic conversation and chatter with a human user. Some toys are stand-alone. Some will "talk" after physical stimulus (e.g., "tickling," "feeding," "hugging," etc.). Some will vary the conversation in conjunction with software games which the child plays on his computer or with shows she watches on the television. This computer or television interaction currently requires the computer or television to send signals to the toy by a cable or wireless method.

There are also toys which "converse" with one another. For example, Furby toys include devices for wireless infrared communications between them, so that Furbies can engage in "conversation" with other Furbies, while their owners watch.

The current art of electronic and electromechanical devices includes a variety of artificial friends and pets that may be wholly virtual (software based) or include a tangible embodiment and that will engage the user in amusing conversation or will converse with each other for the amusement of the user. All such artificial friends (whether or not with a physical embodiment) will be referred to as "chatterbots."

BRIEF SUMMARY OF THE INVENTION

The present invention allows a user's chatterbot to "participate" in instant messaging along with its owner, and thereby allows the user's chatterbot to engage in "conversations" with the user's "buddies" or their chatterbots. The chatterbots may be artificially intelligent or may mimic human conversation. The chatterbots are software controlled agents, each associated with a human user. The chatterbots and their associated human users participate in an electronic chat session. Messages transmitted and received during the electronic chat session are processed in accordance with the present invention. Each message includes the identity of the source (e.g., originator) of the message. Each source is a participant in the electronic chat session that is either a human user or a software controlled agent associated with the human user.

In a preferred embodiment of the present invention when the chatterbot generates a message, the present invention brings the instant messaging software in focus (the invention will cause the focus of the operating system to "attach" to the instant messaging software window). The present invention then inputs the text for the message as if it were generated by keystrokes. However, the present invention first prefaces the text with characters indicating that the message is generated by the chatterbot. For example, if the present invention is embodied as software, the user (say a boy named "Jackie") can enter a name for his chatterbot, such as "Jackie's chatterbot," into the software, then the present invention would preface the chatterbot message with "Jackie's chatterbot says:" The present invention then activates transmission of the message as if it were any instant message (for example, by inputting the "enter" key keystroke). The present invention then returns the focus to whatever the user was doing.

To elaborate, the transmitted message clearly indicates that it is the user's chatterbot generating the message for the amusement of everyone on the buddy list. Suppose a person with the user name "Jackie" is chatting on line with one of his buddies who has a user name "Creampuff". In one embodiment, when Jackie's chatterbot transmits a message, the instant messaging software displays the line "Jackie: Jackie's chatterbot says: . . . " where the phrase "Jackie's chatterbot says:" are the first words of a message from "Jackie:"

If any of the buddies have installed the present invention on their computers, the present invention parses the incoming instant message. If the incoming message is from a chatterbot, this triggers a response from the chatterbot on the buddies computer. In the above example, the incoming message that begins "Jackie: Jackie's chatterbot says: . . . " triggers the chatterbot on Creampuff's computer to generate an appropriate response message, wait a prespecified time (whether a fraction of a second or more than a second) and transmit the response message using the instant messaging software with a preface to the message indicating which chatterbot is "speaking." The instant messaging software now displays the message "Creampuff: Creampuff's chatterbot says: . . . ". As the interactions continue, the buddies' chatterbots are now engaged in conversation for the amusement of the collection of buddies.

A method in accordance with the preferred embodiment of the present invention is now described. A first software controlled agent (e.g., a first chatterbot) automatically generates a first text message (e.g., an instant message). The first software controlled agent is associated with a first human user. Once the first text message is generated, a first source identifier for the first text message is automatically generated and attached to the first text message. The first source identifier includes the identities of the first human user and the first software controlled agent. The first source identifier and the first text message are then transmitted to at least one other participant in the chat session, such as a second software controlled agent or a second human user.

In the case where a second software controlled agent (e.g., a second chatterbot) receives the transmitted first source identifier and the first text message, the software controlled agent may respond by automatically generating a second text message. Once the second text message is generated, a second source identifier for the second text message is automatically generated and attached to the second text message. The second source identifier includes the identities of the second software controlled agent and a second human user associated with the second software controlled agent. The second source identifier and the second text message are then transmitted to at least one other participant in the chat session.

In a first alternative embodiment, a chatterbot responds not only to other chatterbots messages, but also to the buddies' messages.

A method in accordance with the first alternative embodiment of the present invention is now described. A first participant in an electronic chat session (e.g., a first human user) transmits a first source identifier and a first text message (e.g., an instant message). The first source identifier includes the identity of the first participant. A software controlled agent receives the transmitted first source identifier and the first text message. The software controlled agent then responds by automatically generating a second text message. Once the second text message is generated, a second source identifier for the second text message is automatically generated and attached to the second text message. The second source identifier includes the identities of the software controlled agent and a second human user associated with the software controlled agent. The second source identifier and the second text message are then transmitted to at least one other participant in the chat session, such as a software controlled agent or a human user.

In a second alternative embodiment, where a chatterbot on a user's computer includes a text to speech synthesizer, the chatterbot not only synthesizes the sounds of speech for its own message (for its owner to hear) but also the sounds of the messages from the other chatterbots, so the user can hear the chatterbots' conversation. Standard speech synthesis software allows the generation of distinguishing audible characteristics (different voice tonalities) to distinguish between the different chatterbots.

In a third alternative embodiment, a chatterbot on a user's computer includes animation of a "face" in conjunction with speech synthesis (where the text generates corresponding facial expression of related phonemes), so that the image appears to be speaking, the present invention generates images of the other buddies' chatterbots as well, so that the image of each buddy's chatterbot appears to speak the message it transmits to the group. Thus, animated images representing one or more software controlled agents may be displayed on a display screen.

In a fourth alternative embodiment, a parser in the instant messaging software detects that the message is from a chatterbot and does not display it as text, but rather just has the text synthesized into speech. Thus, a determination is made as to whether a received message was generated by a software controlled agent or a human user. If it is determined that the message was generated by a software controlled agent, the message is presented in an audible format. If it is determined that the message was generated by a human user, the message is presented in a text format.

A method of presenting audible messages in accordance with the fourth embodiment is now described. Audible messages are presented (e.g., displayed, outputted from a speaker) to participants in an electronic chat session. The participants are either human users and/or software controlled agents associated with the human users. The software controlled agents associated with the human users are capable of mimicking human conversation and have distinguishing audible characteristics (e.g., different voice tonalities). A first software controlled agent receives a first message generated by a participant in the chat session. The first software controlled agent is associated with a first human user. It is then determined whether the first message was generated by a second human user or a second software controlled agent associated with the second human user.

If it is determined that the first message was generated by the second software controlled agent, the first agent presents the first message to the first human user in an audible format having a first set of distinguishing audible characteristics (a first voice) associated with the identity of the second software controlled agent (the source of the first message). The first software controlled agent then responds to the message by generating a second message and transmitting the second message to at least one other participant in the chat session. The first software controlled agent also presents the second message to the first human user in an audible format having a second set of distinguishing audible characteristics (a second voice) associated with the identity of the first software controlled agent (the source of the second message). Thus human users having associated software controlled agents may listen to a conversation between the software controlled agents.

If it is determined that the first message was generated by the second human user, the first message may be presented to the first human user in a text format.

The first and second messages may be text messages that are converted to speech by the first and second software controlled agents. The software controlled agents may also transmit sound files to a sound file player.

In a fifth alternative embodiment with a parser in the instant messaging software, hidden messages including instructions for controlling an animated image of a software controlled agent (e.g., chatterbot) are generated. The hidden messages are not displayed. The hidden messages may include instructions to control movements of the software controlled agent (e.g., "turn to the left", "jump up and down," "change color," "add purple hair," etc.). In this embodiment, the chatterbots' text messages may be displayed while the animation instructions remain hidden. This will allow deaf users to enjoy the whole show. In this embodiment, the user and his friend while chatting over the Internet, will see and hear their chatterbots conversing in a similar manner as if they were physically visiting each other and playing with their Furbies.

In a sixth alternative embodiment in which the chatterbots are merely the interface for semi-autonomous agents, a user instructs his chatterbot/agent to request certain information from his buddy's chatterbot/agent. The buddy's chatterbot/agent gets confirmation that it is all right to release the data. Then the buddy's chatterbot/agent sends the data via the instant messaging software, or other software. In this embodiment, the user can elect that messages between chatterbots is not displayed, and that only the chatterbot being addressed will be aware of the requested data. In this way a negotiation between various parties and their attorneys can take place when no two individuals are in the same physical location. An attorney can send confidential information to or request confidential information from a client during the negotiation without having the information revealed to an opposing party.

A method of communicating confidential information in accordance with the sixth alternative embodiment of the present invention is now described. The confidential information is communicated during an electronic chat session that has a plurality of participants. The participants include human users and associated software controlled agents that have artificial intelligence. A first human user requests a first software controlled agent associated with the first human user to request information from a second software controlled agent associated with a second human user. The second software controlled agent receives authorization to release the requested information. The second software controlled agent transmits the requested information. The transmitted information is not revealed to the human users.

The present invention processes two types of messages, (1) those originated by a chatterbot on the user's computer and (2) those originated by a chatterbot on another person's computer.

BRIEF DESCRIPTION OF THE DRAWINGS

The foregoing summary, as well as the following detailed description of preferred embodiments of the present invention, will be better understood when read in conjunction with the appended drawings. For the purpose of illustrating the present invention, there are shown in the drawings embodiments which are presently preferred. It should be understood, however, that the present invention is not limited to the precise arrangements and instrumentalities shown. In the drawings.

DETAILED DESCRIPTION OF THE INVENTION

Figure 1:
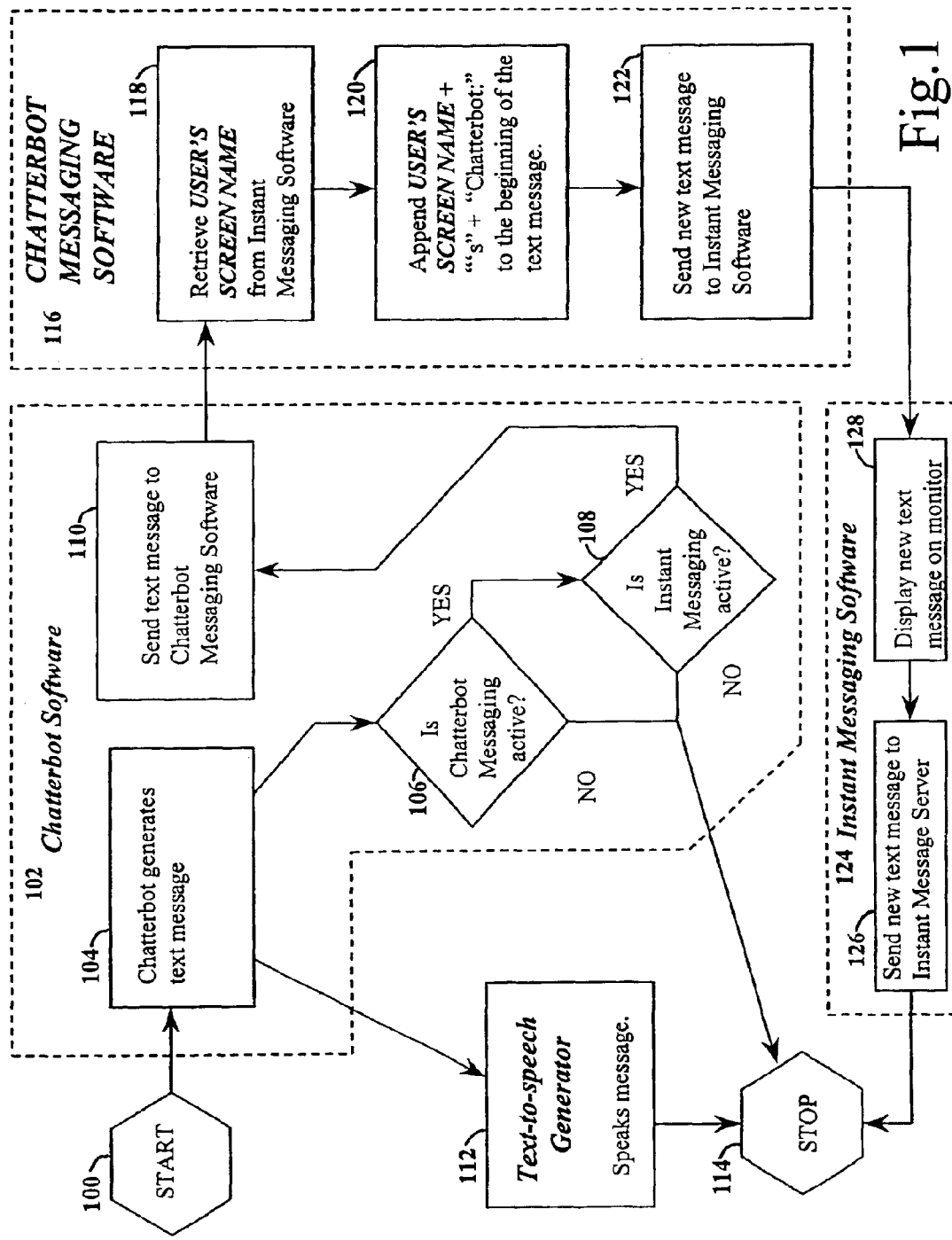
FIG. 1 shows a flowchart where messages originated by the user's chatterbot are processed in accordance with the present invention.

Certain terminology is used herein for convenience only and is not to be taken as a limitation on the present invention. In the drawings, the same reference letters are employed for designating the same elements throughout the several figures.

The preferred embodiment, as shown in FIG. 1, is best understood as four modules, built around open protocols and API's so that they can communicate with each other: either directly, by sending messages to each other, or indirectly, by monitoring the transmissions of other modules. The four modules are an Instant Messaging software module, 124, a chatterbot software module, 102, a text-to-speech generator module, 112, and a chatterbot messaging software module, 116. The general design, function, operation, coding and construction of Instant Messaging software, chatterbot software and text-to-speech generators are well understood by those knowledgeable in the art. In an alternative embodiment two or more of these modules could be integrated into a single software product, which included the modules separate functions. Alternatively, the present invention could be embodied as software with various plug-ins which when combined perform the functions of the described modules.

Referring again to FIG. 1, at the start of the first process, 100, the chatterbot software, 102, generates a text message, 104. The text message could be generated spontaneously or in response to some stimulus. The stimulus could be a message (coming from the user, from another person, from another person's chatterbot, etc.). The stimulus could be another computer event, such as a mouseover (e.g., when the user moves his mouse over the image of the chatterbot, as if the user is stroking, tickling, or feeding the chatterbot) or click event (e.g., when the user launches a game or program). The stimulus may come from another program. For example, the other program may monitor what websites the user is visiting, or what text is being displayed in any particular window (e.g., browser window, chat box window, document).

In this embodiment, the message is sent to a text to speech generator, 112, to "speak" the message. Alternative embodiments eliminate the synthesized speech and just post the message to the monitor. Other Alternative embodiments use wave files instead of a text to speech generator. Still other embodiments will incorporate an animated image or avatar to represent the chatterbot. When the message is sent to the text to speech generator, or wave file media player, it would include instructions for the accompanying animating software. Once the speech is synthesized and any animation displayed, this portion of the process stops, 114. In alternative embodiments of animation programs, the avatar of the chatterbot may continue to move and be animated.

In this embodiment, when the message is sent to the text to speech generator, the chatterbot software also checks the system for whether chatterbot messaging software, 116, is present and active, as determined by query 106. If the answer to query 106 is "no", the process stops, 114. If the chatterbot messaging software is present and active, query 108 determines whether instant messaging software, 124, is present and active. If the answer to query 108 is "no", then again the process stops, 114. In other words, if the instant messaging software and chatterbot messaging software are not both turned on, the chatterbot will only chatter at the user and then stop.

If on the other hand, the instant messaging software and chatterbot messaging software are turned on, the text message which the chatterbot software generated, 104, and sent to the text-to-speech generator, 112, is also sent, 110, to the chatterbot messaging software, 116.

The chatterbot messaging software now adds identifiers to the original text message. The chatterbot messaging software retrieves the screen name that the user is currently employing in the instant messaging session, 118. Suppose that is "CreamCake." The chatterbot messaging software takes the screen name, turns it into a possessive by adding apostrophe s (i.e. "'s") adds the word "Chatterbot" and a colon and then the rest of the original chatterbot text message, 120. For example, if the user's screen name is "CreamCake" the new text message will begin "CreamCake's Chatterbot:" This will be followed by the original text message. The new text message is sent, 122, to the instant messaging software, 124, as if it had originated from the user. In other words, if the chatterbot generates a text message like "You are very cute." The new text message coming out of the chatterbot messaging software is, "Cream-Cake's Chatterbot: You are very cute."

The instant messaging software, 124, processes this new text message by displaying it on the monitor of the user's computer, 128, in the instant messaging software window as if the new text message were sent by the instant messaging software. The instant messaging software, 124, then sends the new text message, 126, over the network on which the instant messaging software is deployed. In this embodiment the instant messaging software, 124, accomplishes this by sending the new text message to a server which re-broadcasts the message to all the members of the user's buddy list. In an alternative embodiment the instant messaging software, 124, may not employ a central server, but may broadcast directly to all members of the buddy list. After the new message is sent, the process stops, 114.

In an alternative embodiment, the user elects which of his buddies will receive the chatterbot's messages, or the user elects that only buddies who have used the instant messaging software in the last several minutes will receive the chatterbot's messages.

In an alternative embodiment, the chatterbot software designates some messages or types of messages only for the user and does not pass those on to the chatterbot messaging software.

Figure 2:
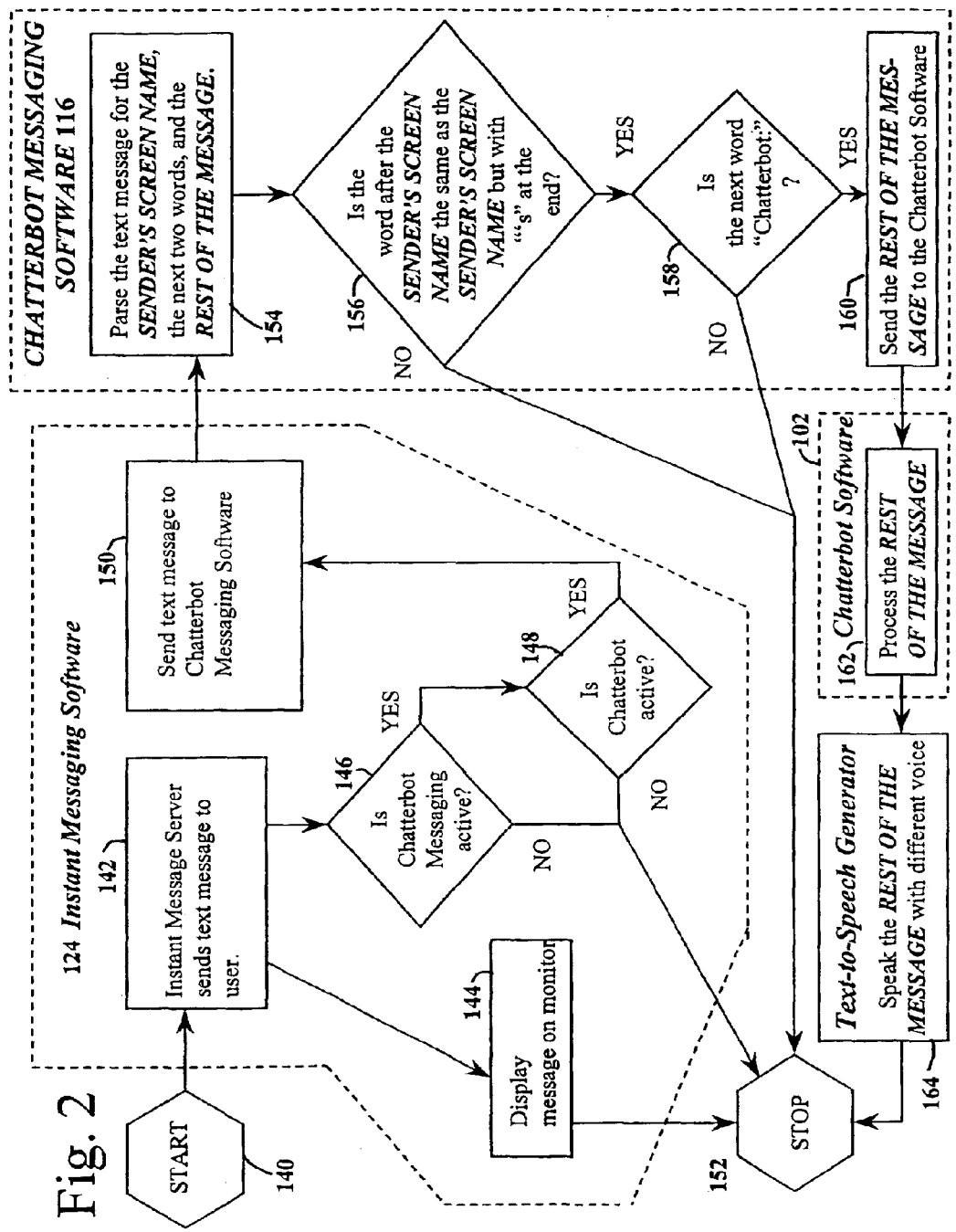
FIG. 2 shows a flowchart where messages originated by a remote chatterbot on another person's computer are processed in accordance with the present invention.

Referring now to FIG. 2, at the start of the second process, 140, the instant messaging server sends a text message to the user, 142, which is received by the instant messaging software, 124, on the user's computer. In an alternative embodiment, the instant messaging software does not use a central server, but rather a one-to-many broadcasting mode, so that another person's computer broadcasts the text message which is received by this user's instant messaging software.

The instant messaging software displays the message in the instant messaging window on the user's monitor, 144, and then that display process stops, 152.

In this embodiment, when the message is sent to the monitor generator, the instant messaging software also checks the system for whether chatterbot messaging software, 116, is present and active, 146. If the chatterbot messaging software is not both present and active, the process stops, 152. If the chatterbot messaging software is present and active, the software checks the system for whether chatterbot software, 102, is present and active, 148. If the chatterbot software is not both present and active, then the process stops, 152. In other words, if the chatterbot software and chatterbot messaging software are not both turned on, the remote chatterbot will only have its chatter displayed on the monitor and then stop.

If on the other hand, the chatterbot software, 102, and chatterbot messaging software, 116, are turned on, the text message which the instant messaging software received, 142, and displayed on the monitor, 144, is also sent, 150, to the chatterbot messaging software, 116.

The chatterbot messaging software now checks for various identifiers in the received text message. The text message always begins with the screen name of the person sending the message. The chatterbot messaging software, 116, parses the text message for the sender's screen name, the next two words and the rest of the message, 154.

Figure 4:
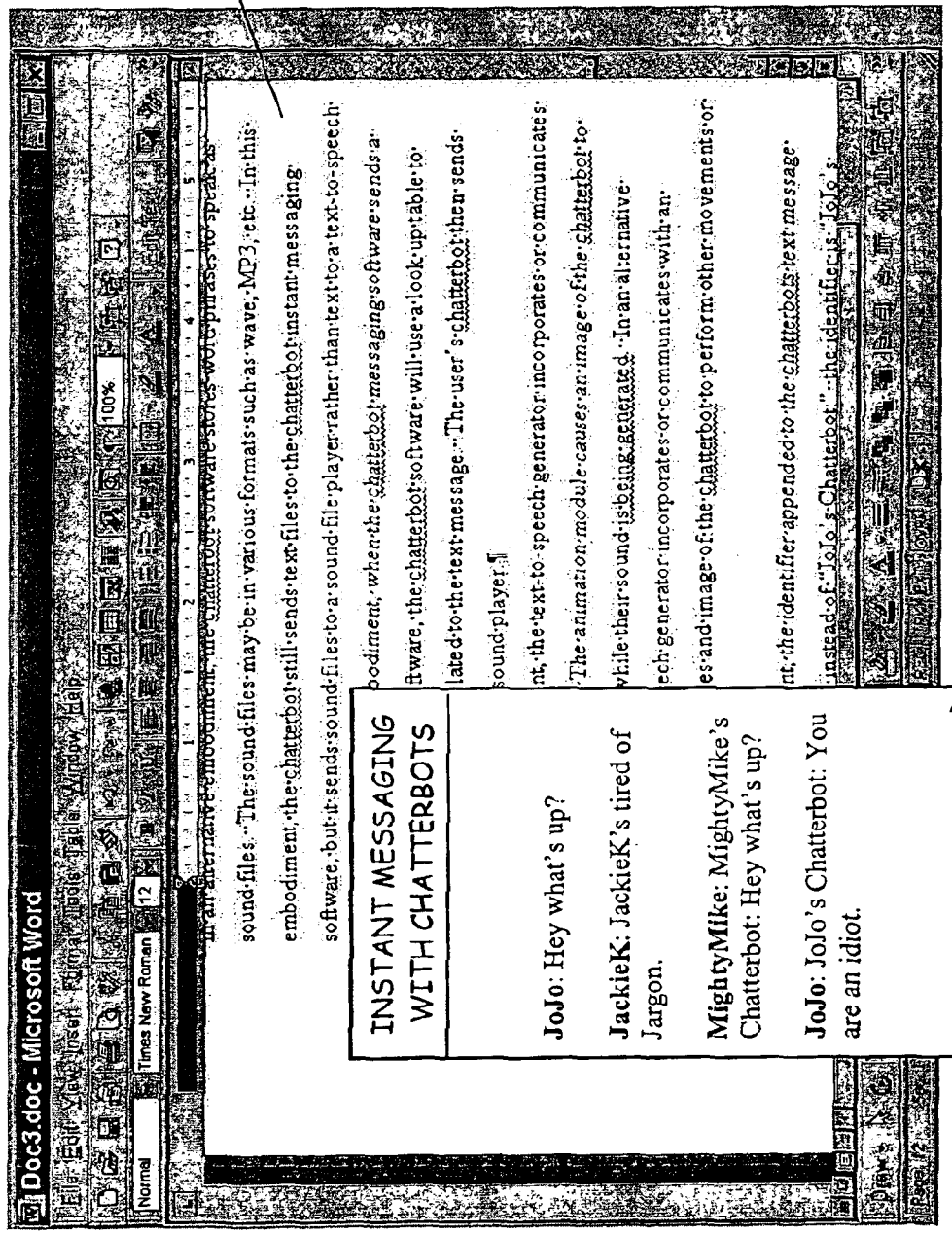
FIG. 4 shows a pictorial diagram illustrating the use of instant messaging during a chat session including both chatterbots and humans.

FIG. 4 shows an example of using instant messaging in accordance with the present invention. While working on a word document, 170, a user receives one or more instant messages which causes a window, 172, to pop up on top of the word document, 170. This window, 172, displays the instant messages from other users and their chatterbots. A text message from "JoJo" reading "JoJo: Hey what's up?" The parser identifies the screen name as "JoJo", the next two words as "Hey" and "what's", and the rest of the message as "up?". As a second example, consider the text message from "JackieK" that reads, "JackieK: JackieK's tired of jargon." In this example, the parser identifies the screen name as "JackieK" the next two words as "JackieK's" and "tired", and the rest of the message as "of jargon". As another example, consider a text message from "MightyMike" that reads "MightyMike: MightyMike's Chatterbot: Hey what's up?" In this example, the parser identifies the screen name is "MightyMike", the next two words as "MightyMike's" and "Chatterbot:", and the rest of the message as "Hey what's up?"

Referring again to FIG. 2, the chatterbot messaging software checks whether the word after the sender's screen name is the same but with apostrophe "s" at the end, 156. If the answer is "no", the process stops, 152. In the example with "JoJo" the process stops.

If the answer is yes, the chatterbot messaging software checks whether the next word is "Chatterbot:", 158. If the answer is no, the process stops, 152. In the example with "JackieK", the process stops.

If the answer is yes, the chatterbot messaging software sends the rest of the message, 160, to the chatterbot software, 102. In the "MightyMike" example, the chatterbot messaging software sends the message "Hey what's up?" to the chatterbot software.

The chatterbot software, 102, processes the rest of the message, 162. Processes include generating a text message in reply, or making animated movements with no text reply, generating a text message with animated movements, making other sounds or doing nothing, etc. The rules and randomizations are indigenous to the particular chatterbot.

The rest of the message is then sent to the text-to-speech generator, 164, where it is spoken. In this embodiment, the message is spoken with a different voice so that the user knows that the message is from a remote chatterbot, rather than his own. In the "MightyMike" example, the chatterbot would speak "Hey what's up?" with a different voice. The process then stops, 152.

Figure 3:
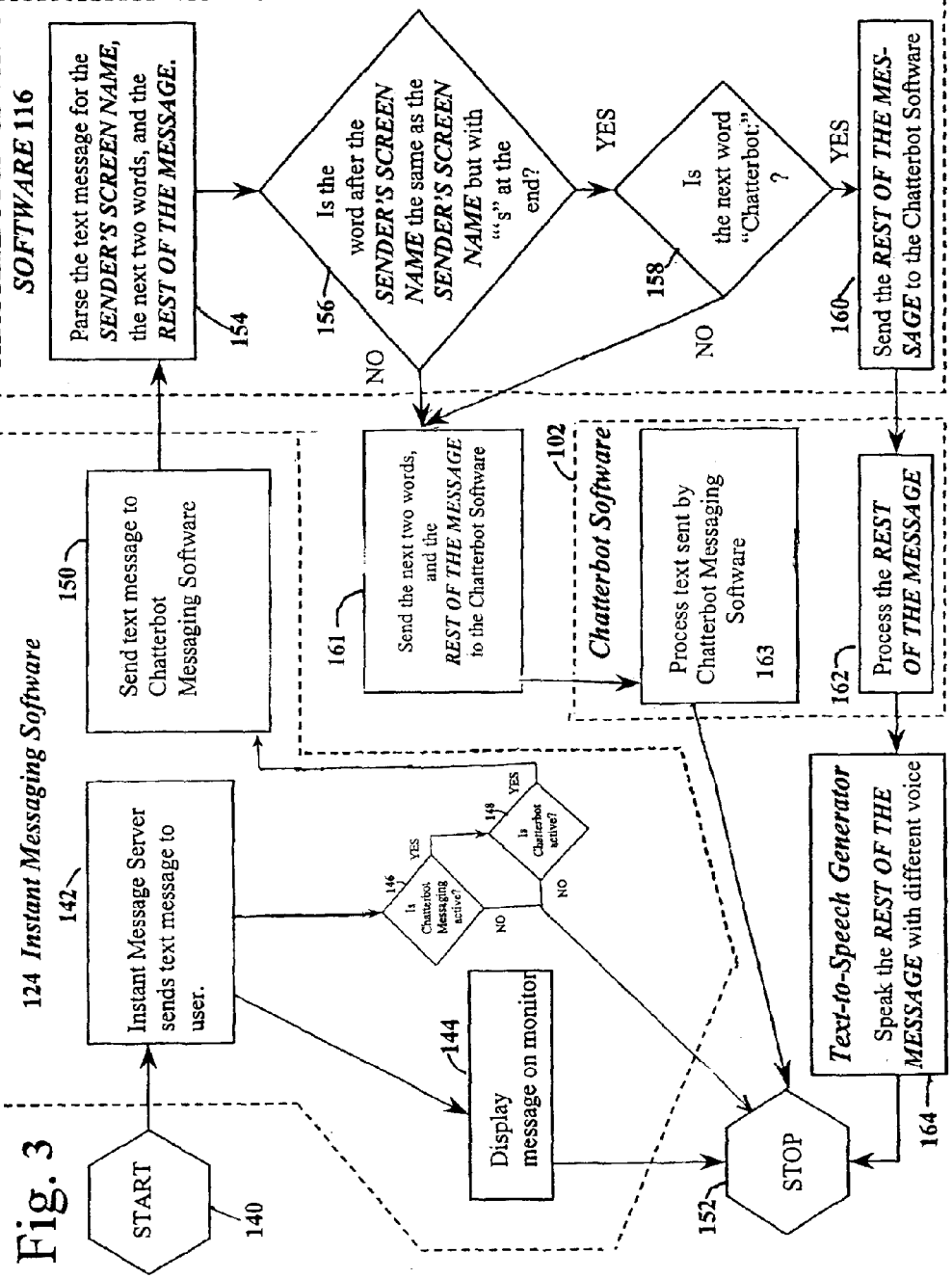
FIG. 3 shows a flowchart where messages originated by a remote chatterbot on another person's computer are processed in accordance with a different embodiment of the present invention.

In an alternative embodiment as shown in FIG. 3, the chatterbot will respond to any message, not just a message generated by another chatterbot. In this embodiment, if the answer to either query 156 or 158 is "no", the next two words, and the REST OF THE MESSAGE are sent to the Chatterbot Software, 161. In other words, all of the message's text except the USER'S SCREEN NAME is sent to the Chatterbot Software, 163. The process text is then sent by the Chatterbot Messaging Software, 163. Steps 162 and 163 are different steps within the Chatterbot Software 102. After the text is processed the process then stops 152.

In a preferred embodiment the chatterbot will process all messages it receives from the Chatterbot Messaging Software in the same manner. In an alternative embodiment, the chatterbot will respond to all messages but will be respond differently depending upon whether the message came from a chatterbot or a person. For example, the chatterbot might be programmed to respond "You are an idiot" to another chatterbot, but to a person, it might say, "I beg your pardon, but you are an idiot."

In an alternative embodiment, all messages are spoken in the same voice.

In an alternative embodiment, only the user's messages are spoken. In an alternative embodiment, no voices are spoken, but only displayed on the monitor.

In an alternative embodiment, the chatterbot software stores word phrases to speak as sound files. The sound files may be in various formats such as wave, MP3, etc. In this embodiment, the chatterbot still sends text files to the chatterbot instant messaging software, but it sends sound files to a sound file player rather than text to a text-to-speech generator. Also, in this embodiment, when the chatterbot messaging software sends a text file to the chatterbot software, the chatterbot software will use a look up table to know which sound file is related to the text message. The user's chatterbot then sends the sound file to the user's sound player.

In an alternative embodiment, the text-to-speech generator incorporates or communicates with an animation module. The animation module causes an image of the chatterbot to appear to speak the words while their sound is being generated. In an alternative embodiment the text-to-speech generator incorporates or communicates with an animation module that causes and image of the chatterbot to perform other movements or actions.

In an alternative embodiment, the identifier appended to the chatterbots text message would differ. For example, instead of "JoJo's Chatterbot:" the identifier is "JoJo's Chatterbot says:". The present invention is not limited to the particular phrases, text or symbols used in the identifier. In an alternative embodiment, the identifier contains additional code that instructs the chatterbot software how to animate an image of the chatterbot. In some embodiments this code will not be displayed on any person's computer, but will be parsed by the software and transmitted to the chatterbot software for processing.

Although the present invention has been described as if it resides on an individual computers, the software or its modules or parts thereof may be distributed among devices on the network and among other devices.

The present invention is intended to include, for example, embodiments in which a Furby toy contains portions of the chatterbot software. For example, a Furby toy contains a message generator that speaks the message and transmits a version of the message to other Furbies via an infrared transmitter on its forehead. The Furby's forehead also contains an infrared receiver to receive messages from other Furbies. In an alternative embodiment of this invention, a Furby or similar device contains part of the chatterbot software, 102. The Furby or similar device generates, 104, and speaks a message, 112. The Furby or similar device also broadcasts an infrared transmission of a version of or key to the message. The portion of the chatterbot software, 102, in the user's computer receives the broadcast via an infrared receiver and accomplishes (along with the other software in the user's computer) the remainder of steps of FIG. 1, 106, 108, 110, 118, 120, 122, 126, 128, 114. To do this, step 110, is augmented by a look up table that translates the infrared transmission into a text version of the message which the Furby or similar device spoke.

In this embodiment, the steps of FIG. 2 remain the same. However step 162 is augmented by a lookup device that translates the rest of the message into a version or key which it transmits via an infrared transmitter to the nearby Furby or similar device. The Furby or similar device then processes that transmission and generates a new message or not depending on its programmed code.

The embodiments described above include steps 106, 108, and 110 of FIG. 1 in the chatterbot software, 102. In an alternative embodiment, these steps are included in the chatterbot messaging software, 116, in an altered form. In this alternative embodiment, the chatterbot messaging software when active is continuously monitoring the chatterbot software. Step 106 is altered to read "Has the chatterbot generated a text message?" and step 110 is altered to read "retrieve the text message generated by the chatterbot software." The rest of the steps are the same.

Similarly, the embodiments described above include steps 146, 148 and 150 of FIG. 2 in the instant messaging software, 124. In an alternative embodiment, these steps are included in the chatterbot messaging software, 116, in an altered form. In this alternative embodiment, the chatterbot messaging software when active is continuously monitoring the instant messaging software. Step 146 is altered to read "Has the instant messaging software received a message?" and step 150 is altered to read "retrieve the text message received by the instant messaging software." The rest of the steps are the same.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of processing messages transmitted and received during an electronic chat session, the chat session having a plurality of participants, each message including the identity of the source of the message, each source being a participant in the chat session that is either a human user or a software controlled agent associated with the human user, the software controlled agent mimicking human conversation, the method comprising:

(a) a first software controlled agent automatically generating a first text message, the first agent being associated with a first human user;

(b) automatically generating a first source identifier for the first text message and attaching it to the first text message, the first source identifier including the identities of the first human user and the first agent;

(c) transmitting the first source identifier and the first text message to at least one other participant in the chat session; and (d) allowing the first human user associated with the first software controlled agent to enter text messages and transmit any such entered text messages in the same chat session as the chat session that the first software controlled agent generates and transmits messages, the first human user being identified as a different entity than the first software controlled agent.

2. The method of claim 1, further comprising:

(e) a second software controlled agent receiving the transmitted first source identifier and the first text message, and in response thereto:

(i) automatically generating a second text message;

(ii) automatically generating a second source identifier for the second text message and attaching it to the second text message, the second source identifier including the identities of the second agent and a second human user associated with the second agent; and (iii) transmitting the second source identifier and the second text message to at least one other participant in the chat session.

3. The method of claim 1, wherein the at least one other participant is a second software controlled agent.

4. The method of claim 1, wherein the at least one other participant is a second human user.

5. A method of processing messages transmitted and received during an electronic chat session, the chat session having a plurality of participants, each message including the identity of the source of the message, each source being a participant in the chat session that is either a human user or a software controlled agent associated with the human user, the software controlled agent mimicking human conversation, the method comprising:

(a) a first participant transmitting a first source identifier and first text message, the first source identifier including the identity of the first participant; and (b) a software controlled agent receiving the transmitted first source identifier and the first text message, and in response thereto:
  (i) automatically generating a second text message;
  (ii) automatically generating a second source identifier for the second text message and attaching it to the second text message, the second source identifier including the identities of the agent and a human user associated with the agent;
  (iii) transmitting the second source identifier and the second text message to at least one other participant in the chat session; and (c) allowing the human user associated with the software controlled agent to enter text messages and transmit any such entered text messages in the same chat session as the chat session that the software controlled agent generates and transmits messages, the human user being identified as a different entity than the software controlled agent.

6. The method of claim 5, further comprising:

(d) generating at least one hidden message including instructions for controlling an animated image of the software controlled agent, wherein the hidden message is not displayed.

7. The method of claim 5, wherein the at least one other participant is a software controlled agent.

8. The method of claim 5, wherein the at least one other participant is a human user.

9. An article of manufacture for processing messages transmitted and received during an electronic chat session, the chat session having a plurality of participants, each message including the identity of the source of the message, each source being a participant in the chat session that is either a human user or a software controlled agent associated with the human user, the software controlled agent mimicking human conversation, the article of manufacture comprising a computer-readable medium holding computer-executable instructions for performing a method comprising:

(a) a first software controlled agent automatically generating a first text message, the first agent being associated with a first human user;

(b) automatically generating a first source identifier for the first text message and attaching it to the first text message, the first source identifier including the identities of the first human user and the first agent;

(c) transmitting the first source identifier and the first text message to at least one other participant in the chat session; and (d) allowing the first human user associated with the first software controlled agent to enter text messages and transmit any such entered text messages in the same chat session as the chat session that the first software controlled agent generates and transmits messages, the first human user being identified as a different entity than the first software controlled agent.

10. The article of manufacture of claim 9, wherein the computer-executable instructions perform a method further comprising:

(e) a second software controlled agent receiving the transmitted first source identifier and the first text message, and in response thereto:
  (i) automatically generating a second text message;
  (ii) automatically generating a second source identifier for the second text message and attaching it to the second text message, the second source identifier including the identities of the second agent and a second human user associated with the second agent; and
  (iii) transmitting the second source identifier and the second text message to at least one other participant in the chat session.

11. The article of manufacture of claim 9, wherein the at least one other participant is a second software controlled agent.

12. The article of manufacture of claim 9, wherein the at least one other participant is a second human user.

13. An article of manufacture for processing messages transmitted and received during an electronic chat session, the chat session having a plurality of participants, each message including the identity of the source of the message, each source being a participant in the chat session that is either a human user or a software controlled agent associated with the human user, the software controlled agent mimicking human conversation, the article of manufacture comprising a computer-readable medium holding computer-executable instructions for performing a method comprising:

(a) a first participant transmitting a first source identifier and first text message, the first source identifier including the identity of the first participant; and (b) a software controlled agent receiving the transmitted first source identifier and the first text message, and in response thereto:
  (i) automatically generating a second text message;
  (ii) automatically generating a second source identifier for the second text message and attaching it to the second text message, the second source identifier including the identities of the agent and a human user associated with the agent;
  (iii) transmitting the second source identifier and the second text message to at least one other participant in the chat session; and (c) allowing the human user associated with the software controlled agent to enter text messages and transmit any such entered text messages in the same chat session as the chat session that the software controlled agent generates and transmits messages, the human user being identified as a different entity than the software controlled agent.

14. The artice of manufacture of claim 13, wherein the computer-executable instructions perform a method further comprising:

(d) generating at least one hidden message including instructions for controlling an animated image of the software controlled agent, wherein the hidden message is not displayed.

15. The article of manufacture of claim 13, wherein the at least one other participant is a software controlled agent.

16. The article of manufacture of claim 13, wherein the at least one other participant is a human user.

* * * * *